United States Patent [19]
Sartori

[11] 3,800,582
[45] Apr. 2, 1974

[54] DEFORMING A SLOTTED TUBE
[75] Inventor: Raymond Gerald Sartori, Rockville, Md.
[73] Assignee: Liskey Aluminum, Inc., Glen Burnie, Md.
[22] Filed: Mar. 23, 1972
[21] Appl. No.: 237,485

[52] U.S. Cl............................................ 72/78, 72/52
[51] Int. Cl............................ B21h 3/04, B21h 9/00
[58] Field of Search................. 72/52, 78, 100, 177; 29/477.7

[56] References Cited
UNITED STATES PATENTS

| 967,178 | 8/1910 | Edison et al.............................. | 72/52 |
|---|---|---|---|
| 2,150,815 | 3/1939 | Berger..................................... | 72/100 |
| 137,992 | 4/1873 | Wilmot..................................... | 72/52 |
| 157,653 | 12/1874 | Tasker..................................... | 72/177 |
| 575,225 | 1/1897 | Prick et al............................... | 72/177 |
| 2,911,030 | 11/1959 | Kocks..................................... | 72/177 |
| 456,059 | 7/1891 | Prentice................................... | 72/52 |

Primary Examiner—Lowell A. Larson
Attorney, Agent, or Firm—Mason, Mason and Albright

[57] ABSTRACT

This invention is concerned with a work holder for a slotted tube to be deformed, preferably by moving the tube to a deforming work station and preventing the tube from rotating. The tube is fitted with an internal mandrel which is held in a fixed position by a vice. The mandrel has an upright blade that extends through the keyway of the slotted tube so that the tube can be slid along the mandrel relative to the deforming work station. In one method, continuous lengths of hollow pipes, tubes and the like can be threaded or otherwise externally deformed by supporting the workpiece internally with the mandrel. By changing the mandrel size, tubes of varying diameter can be accommodated. The deformed workpiece can be used in a variety of applications, one of which is a threaded hollow tube or stem member that has a cap welded to the rim of the tube to provide a pedestal cap of improved strength.

10 Claims, 5 Drawing Figures

DEFORMING A SLOTTED TUBE

Current techniques of threading tubes, rods and pipes involve the threading of same by deformation, cutting and/or abrading wherein the work and work holder are moved towards the tool or vice versa. Thus, it is necessary to cut and use relatively short lengths of workpieces and to provide for replacement feed. Also, time and effort must be spent on repositioning the work holders and/or tool.

The present invention provides an apparatus and method to continuously deform a workpiece of any length and to avoid the necessity of using short length workpieces as well as reset of the work holder and/or tool.

It is an object of the present invention to provide an apparatus and method of continuously deforming a hollow member by moving same relative to its holder while the latter provides mandrel support adjacent the tool.

It is another object of the present invention to provide an apparatus and method for externally and/or internally deforming, including threading, a hollow keyed or slotted tube, which can be self-feeding and in continuous operation after startup.

It is a further object of the present invention to provide a new and improved slotted tube product; these and other objects will be apparent from the specification and drawings in which.

Figure 1:
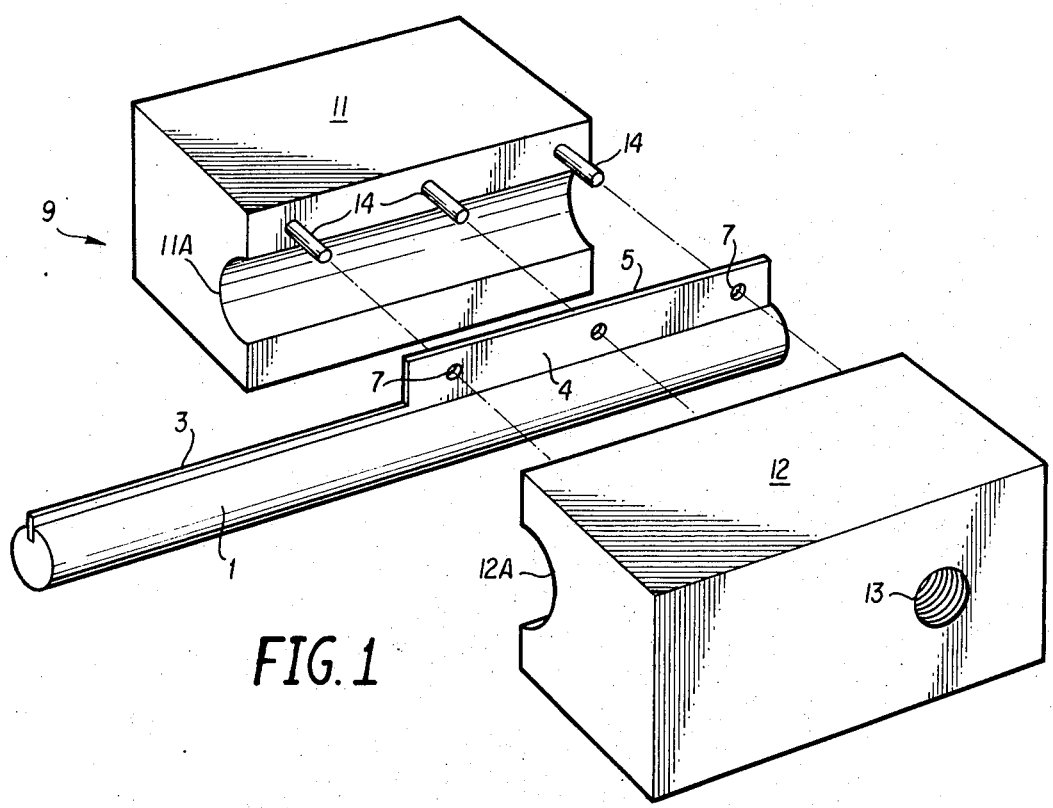
FIG. 1 is an exploded perspective view of the work holder.

In FIG. 1, a work holder includes a mandrel 1 with an upright blade 4 having a stepped down forward portion 3 and a raised portion 5, the latter being provided with apertures 7 along its length. The mandrel 1 is shown solid and round to internally fit and support a round hollow tube workpiece. The mandrel 1 can have any matching configuration to conform to the workpiece, such as square, hexagon, etc. Also, the mandrel 1 can be hollow, at least in part, so long as it has sufficient strength to provide the desired internal support to a hollow workpiece being deformed.

A block vice 9 includes two separable segments 11 and 12, the former having dowels 14 which can pass through apertures 7 of blade 4 to correspond and mate with wells of segment 12 when the work holder is assembled. The segment 12 has a threaded aperture 13 for attachment to the carriage of the deforming machine. Each segment, 11 and 12, have semi circular recesses 11A and 12A respectively which loosely receive the mandrel rod 1. The recesses 11A and 12A together form a circular opening extending through the vice 9 but the shape of the opening can be otherwise contoured so long as sufficient space 20 is allowed so that a variety of different sized mandrels and workpieces can be loosely held.

Figure 2:
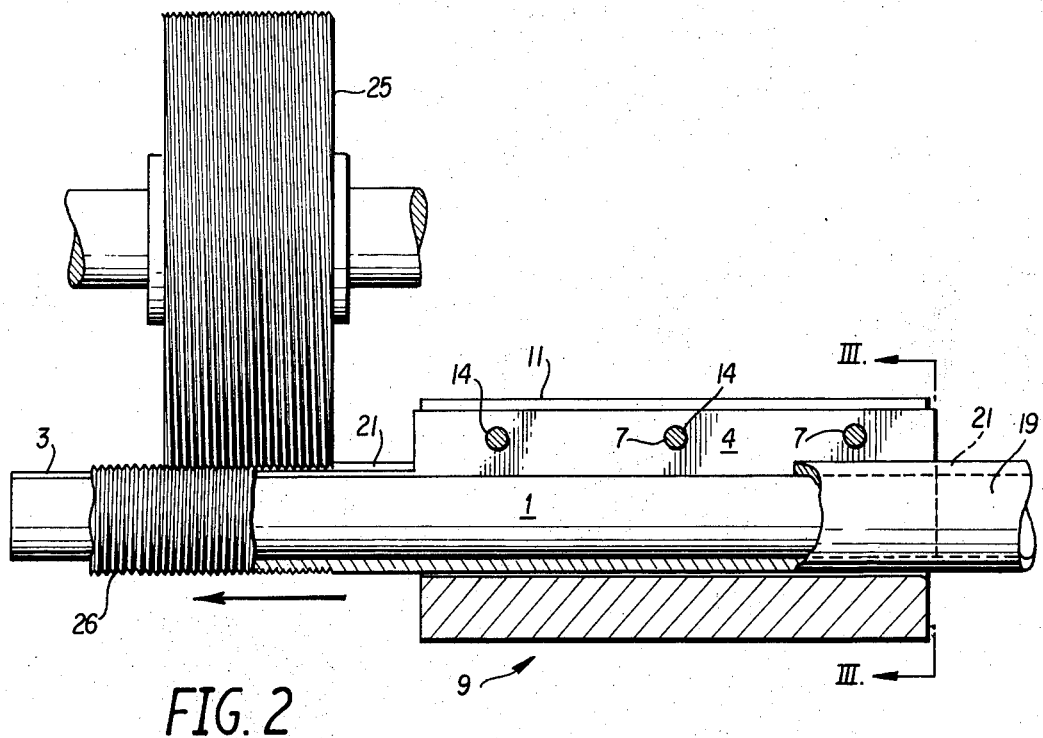
FIG. 2 is a section view in elevation of the work holder of FIG. 1 with a workpiece supported during external deformation by a thread roll.
Figure 3:
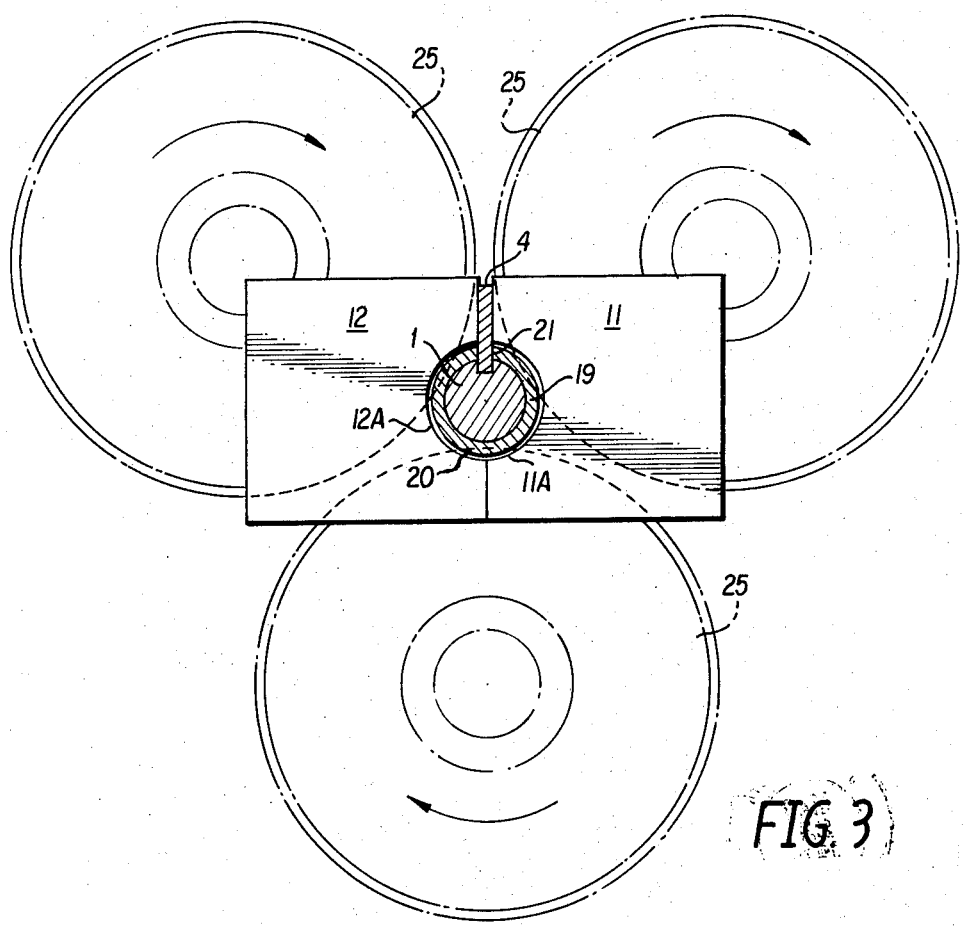
FIG. 3 is a rear view of the FIG. 2 assembly in section taken along the lines III — III of FIG. 2.

A workpiece in the form of a slotted, circular and hollow tube 19 is fitted with the work holder as shown in FIGS. 2 and 3 so that the stepped down portion 3 is fitted in the slot without extending completely through same. The slot 21 of the tube 19 extends longitudinally of the tube's length so that the blade 4 extends through the slot and prevents the tube from rotating while the tube 19 can be moved relative to the mandrel 1 and the blade 4 by sliding.

As viewed in FIGS. 2 and 3, the work holder 2 can be positioned adjacent a deforming station, for instance an assembly of rotating thread rolls 25. As the rolls 25 are rotated, the tube 19 is drawn when threads 26 are formed. The mandrel 1 extends through the tube 19 to support same internally adjacent the work station. It will be appreciated that any length of tube or other hollow workpiece can be continuously deformed if the slot 21 is made long enough. In threading steel tubes, for instance, a flat strip can first be bent in the shape of a round tube, leaving a slot that runs the length of the tube so that the entire tube length can be threaded in a single operation.

The threading mechanism per se forms no part of the invention claimed herein, it being understood that the work holder is secured using threaded hole 13 to the carriage in place of the usual gripping chuck. In a Landis Machine Company 10 TRM thread rolling machine, for instance, the carriage moves relative to the thread rollers and stops when a relative short length of pipe is threaded. Using the work holder described herein, once the carriage has stopped, the threading assembly simply draws the slotted pipe along the mandrel while the stepped portion 3 and the blade 4 in the slot 21 prevent the tube 19 from rotating. The pipe or tube is then continuously drawn to the thread rollers while the carriage and mandrel remain stationary.

The present invention, inter alia, provides full formed threads in one pass, with an integral keyway if desired or a closed seam by terminating the blade 4 midway through the work station. Variations to blade 4 with respect to width of profile can produce controlled variations to the finished keyway, varying from close tolerance control to a completely closed seam. Contoured mandrels allow selective internal deformation of the tube workpiece.

The work holder disclosed herein is an internal support for simple and complex forms, allowing accurate forming on either/or/and, inside and outside surface to predetermined contours and positive internal profile, if desired. Previous methods of continuously threading tubular stock employed full length mandrels rather than support only in the area of the work deformation. Another benefit derived using this method is that the entire tube can be threaded. Prior art methods require each piece to be cut to specific length, then chucked individually and threaded to the required length, with the portion in the chuck remaining unthreaded and, in essence, unusable.

Figure 4:
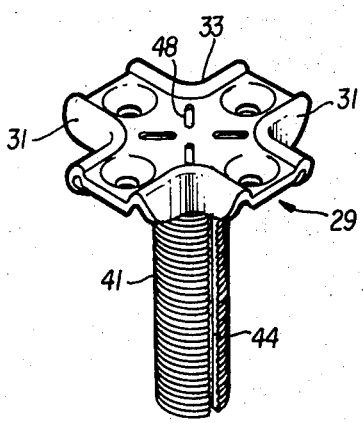
FIG. 4 is a perspective view of a pedestal cap made from the workpiece.
Figure 5:
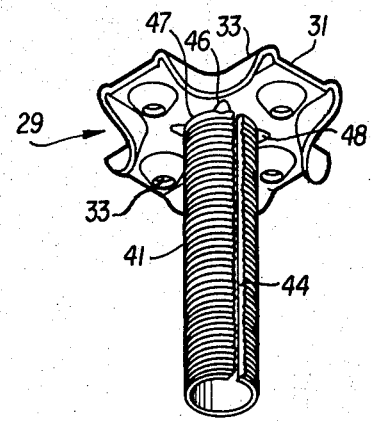
FIG. 5 is a further perspective view of the FIG. 4 pedestal cap showing the welded areas of a workpiece tube to a top member.

FIGS. 4 and 5 show a pedestal cap of the type shown in U.S. Pat. No. 3,616,584 wherein the cap includes an upper cap member and a depending threaded shaft with a keyway to receive the key of an encapsulating member which retains a stop nut. Such a cap can be made as shown in FIG. 4 with a top cap member 29 having arms 31 with ribs 33 and apertures 35 on each arm.

The depending threaded stem or shaft 41 is slotted at 44 to receive an encapsulating member with a key in the same fashion shown in FIG. 1 of U.S. Pat. No. 3,616,584. The cap member 29 has four spaced apart welded spots 46 which join the top cap member 29 to the shaft 41. The shaft 41 can be made in accordance with the disclosure herein for deforming a slotted tube 19 so that the tube 19 and the slot 21 of FIGS. 1 – 3 correspond to 41 and 44 respectively of FIGS. 4 and 5.

In FIG. 5, it should be noted that weld spots 46 on the underside of top 29 are superimposed on elongated dimples 48. The dimples 48 are preformed to receive the welding electrodes so that the welding spots bridge the periphery 47 of shaft 41 at right angles in four spaced apart areas. It has been found that the welding of a hollow shaft 41 to the top 29 as described herein results in a pedestal cap assembly of greatly improved strength. Heretofore, the stems of pedestal caps were formed by a solid shaft to a cap rather than a hollow tube comprising shaft 41, to the top 29.

It is preferred that top 29 be preformed with dimples 48 at its central portion to correspond to the general configuration of the welding electrodes so that the weld spots 46 include the dimples 48 which are concave at the upper surface of top 29 and convex at the under surface thereof.

The use of a hollow tube has many benefits over the prior art solid keyed rod which is welded to the pedestal cap. Obviously, the material content is less, with a corresponding reduction in cost of material, handling is easier because of weight while subsequent cutting and other operations are simplified. Welding of the hollow shaft has resulted in an easier and more structurally sound weld as compared to the solid rod, because with the hollow tube, a more equal pair of material thicknesses are jointed, permitting an equal heating and common fusing, thereby, obtaining a stronger and more uniform weld joint.

Other variations of the continuous deforming or embossing process, other than threading, are possible using a split hollow tube which can vary greatly in tube wall thickness, outside diameter and inside diameter and mounting same on an exterior supported, interior-positioned mandrel to prevent angular rotation, but allowing axial movement. Thus, an open seam split tube threaded on the outside loosely supported on the inside diameter can be quickly closed immediately before the threading operation by using additional guides so that the inside mandrel can remain in its aforementioned position. The tube then becomes a closed seam, continuously threaded column. Also, the closed seam can be welded before threading for a welded, continuously threaded column.

Operations requiring longitudinal embossing can be greatly expanded using the principal generated by this invention. Continuously contoured columns, round, square, hexagon, etc.; with open, closed and welded seams can be produced in uninterrupted lengths, in a full range of sizes and wall thicknesses. Many other applications are apparent such as serrating, some forms of bellowing, etc. Many materials can be processed such as steel, copper, plastic, etc. and fused or glued seams can be substituted for welding.

What is claimed is:

1. A work holder comprising an elongated mandrel for insertion in a hollow slotted tube being deformed, said mandrel having an upright key blade extending in a direction generally parallel to the longitudinal axis of said mandrel, vice means for securing said mandrel in a fixed position, said vice means being connected to said key blade and comprising a hollow block member with an opening which loosely encircles said mandrel leaving a space for the sliding passage of the tube being deformed.

2. The holder of claim 1, wherein said mandrel has a configuration that matches the configuration of the tube being held.

3. The holder of claim 1, wherein said hollow block member which form said opening comprises two separable segments and each of said segments has a semi circular recess whereby said mandrel and the tube being processed, can be fitted in the recess of each segment when the block member is assembled.

4. The holder of claim 3, wherein one of said segments has dowels which can be passed through apertures in the key blade of said mandrel and mated in wells of the second of said segments when the holder is assembled.

5. The holder of claim 1, wherein said upright key blade extends radially upwardly at one end of said mandrel and said blade is provided with holding means for association with said vice means.

6. The holder of claim 1, wherein said work holder is positioned adjacent a deforming tool and the mandrel extends within said tool to provide support for the tube being deformed.

7. A process for deforming a hollow slotted tube comprising the steps of moving said tube to a deforming tool station and securing said tube from rotation by extending a key from an internal mandrel through the slot of the tube, retaining said mandrel and key in fixed position relative to the deforming tool station by a holder and continuing the movement of said tube through an opening in the holder and sliding the tube along the mandrel while allowing the key to extend through the slot during the movement of the tube.

8. The process of claim 7, wherein the mandrel is fixed in position by a block member having an opening and the tube is loosely held by the mandrel in the opening.

9. The process of claim 7, wherein the tube is roll threaded by rotating deforming rollers about the tube adjacent the mandrel.

10. The process of claim 7, wherein the tube is selectively supported internally by the mandrel to allow predetermined internal deformation.

* * * * *